Dec. 4, 1934.  D. R. HALL  1,982,804
WORK SUPPORTING FIXTURE
Filed Nov. 19, 1931  3 Sheets-Sheet 1
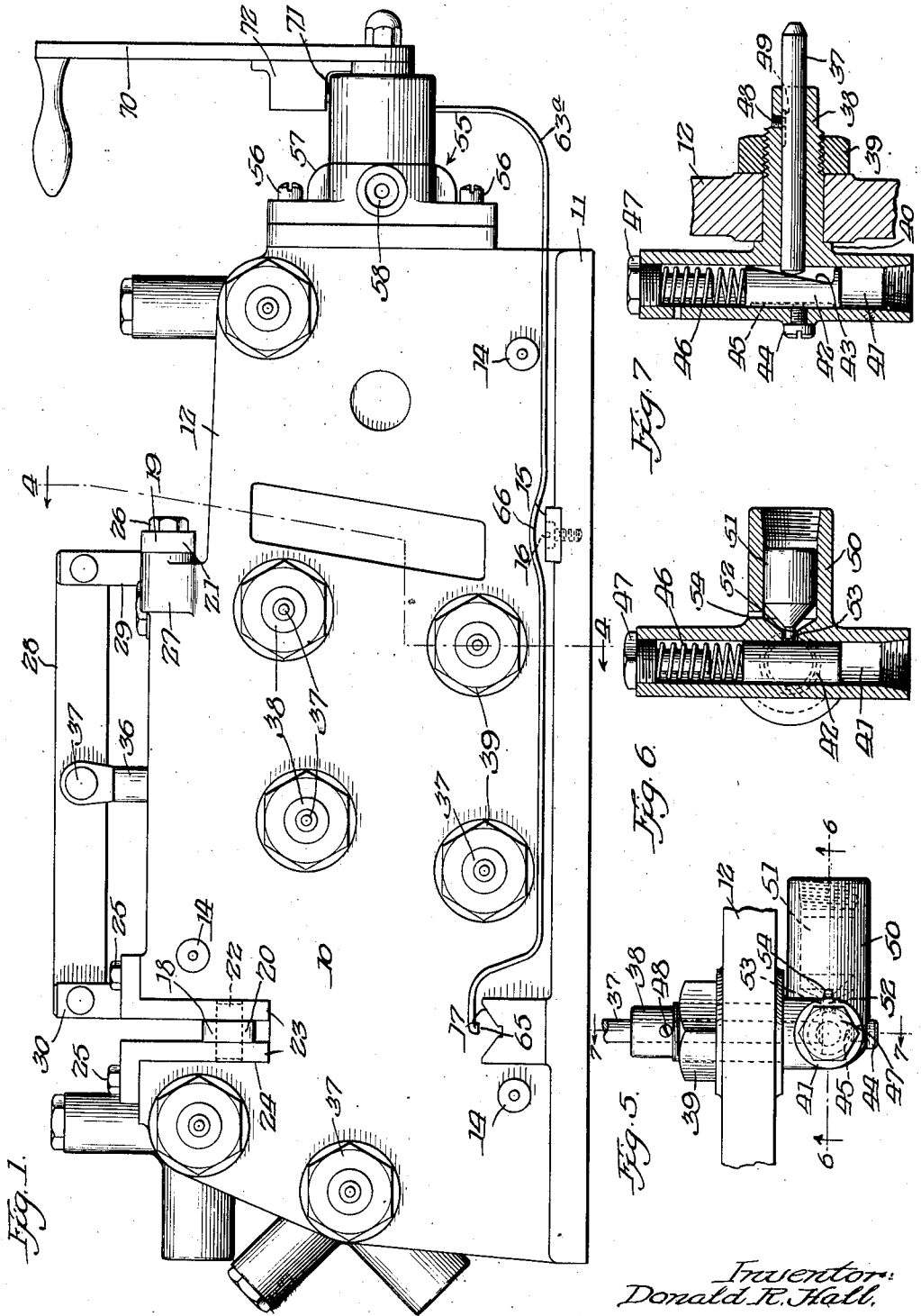

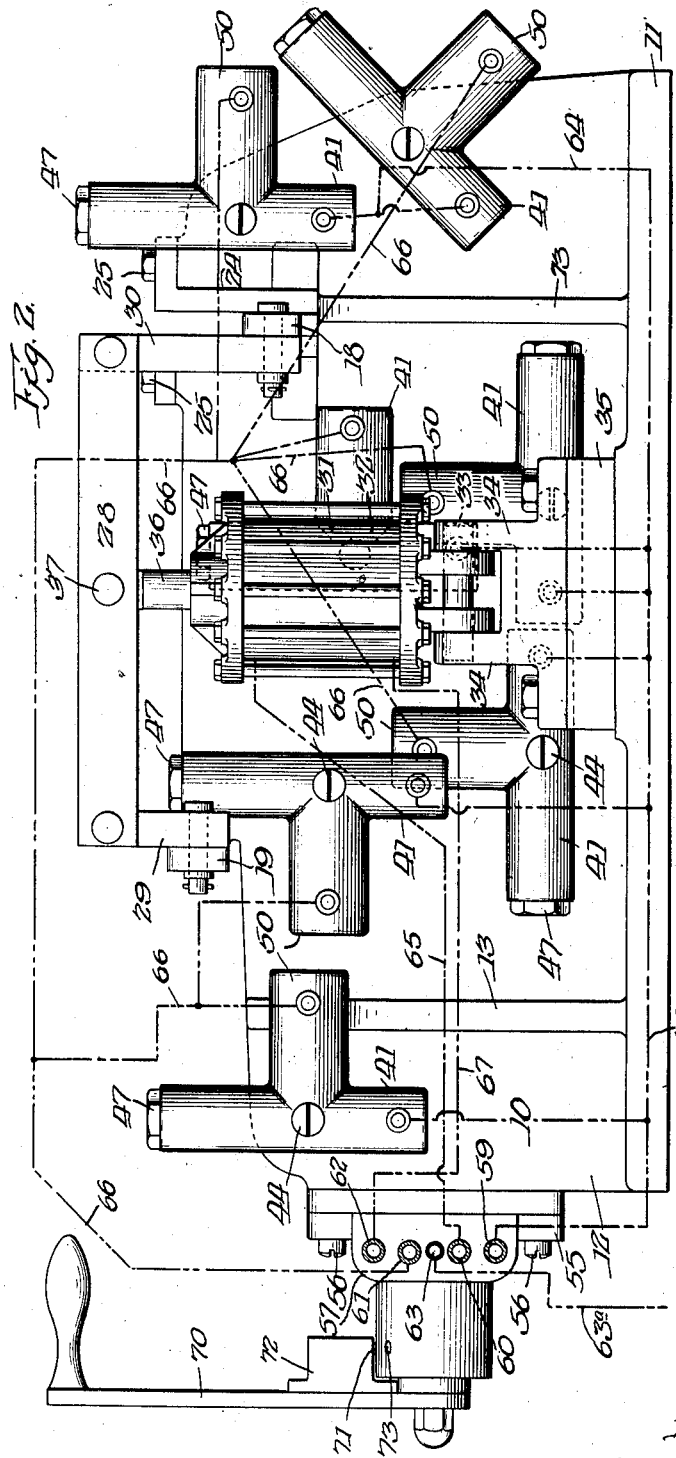

Dec. 4, 1934.   D. R. HALL   1,982,804
WORK SUPPORTING FIXTURE
Filed Nov. 19, 1931   3 Sheets-Sheet 3
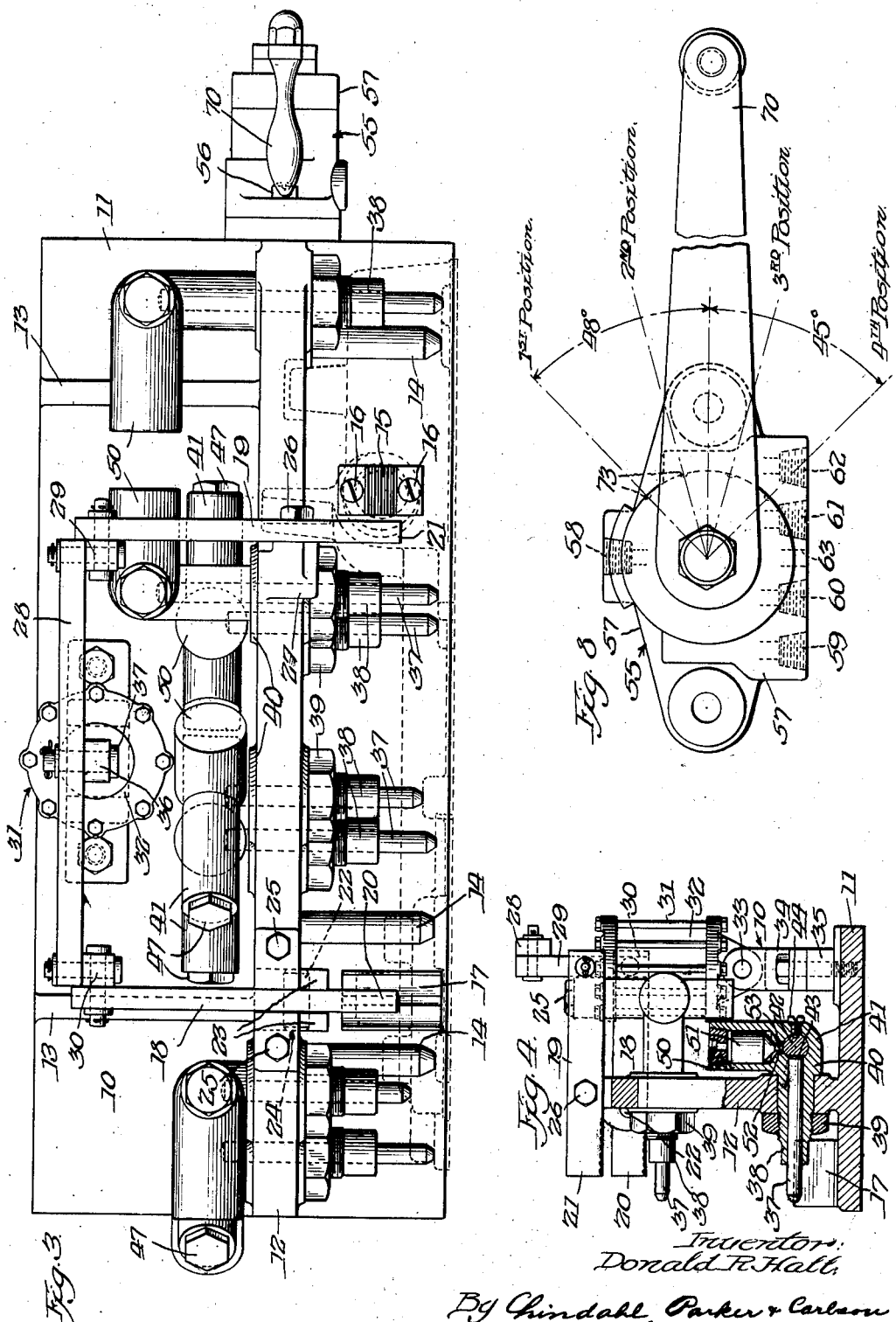

Patented Dec. 4, 1934

1,982,804

UNITED STATES PATENT OFFICE 1,982,804

WORK SUPPORTING FIXTURE

Donald R. Hall, Beloit, Wis., assignor to Gardner Machine Company, Beloit, Wis., a corporation of Wisconsin Application November 19, 1931, Serial No. 576,067

21 Claims. (Cl. 51—217)

The invention relates to a new and improved work supporting fixture of the class employed on machine tools.

One object of the invention is to provide a work supporting fixture embodying new and improved means to rigidly sustain the work against yielding movement while in operative engagement with a tool.

Another object of the invention is to provide a novel work supporting means in which a plurality of shiftable and automatically positioned abutments are adapted to contact the work at spaced points upon its surface to uniformly resist the pressure of a tool during a working operation.

In connection with the foregoing object it is within the contemplation of the invention to simultaneously lock the several shiftable abutments in work engaging position and to thereafter simultaneously release the abutments.

A further object resides in the provision of a fixture in which the work is successively positioned, clamped, and supported for operation in contact with a tool by a single manually operable means.

A more specific object of the invention is to provide a work fixture in which a set of stationary abutments serve to orient the work with respect to an operating tool and a plurality of spaced shiftable abutments individually and independently contact the work, after which the work is clamped against the stationary abutments, and the shiftable abutments are locked in engagement with the work.

Another object is the provision of a new and improved fixture of the above character on which an irregularly shaped work piece may be quickly oriented and locked in position to be operated on by a tool, a non-planar surface of the piece opposite the surface to be worked being contacted with uniform pressure by a plurality of spaced shiftable abutments so as to prevent distortion of the surface to be worked.

More specifically stated, the object of the invention is to provide a novel fixture for stationarily holding a piece of work, having a flat face to be ground, the fixture having pneumatically operated means arranged to clamp the work edgewise and to abut the work at the side opposite said flat face to prevent distortion by the pressure of the grinding element, said pneumatic means being controlled by a manually operated valve to effect first clamping and then abutment of the work.

Ancillary objects and advantages will become apparent from the following description of a preferred embodiment of the invention, taken in connection with the accompanying drawings, in which:

Figure 1 is a front elevational view of a work supporting fixture embodying the preferred form of the invention.

Fig. 2 is a rear elevational view of the fixture shown in Fig. 1.

Fig. 3 is a plan view of the fixture.

Fig. 4 is a vertical sectional view taken along line 4—4 of Fig. 1.

Fig. 5 is a fragmentary plan view of the fixture showing the mounting of a shiftable abutment.

Fig. 6 is a sectional view taken along line 6—6 of Fig. 5.

Fig. 7 is a sectional view taken along line 7—7 of Fig. 5.

Fig. 8 is an elevational view of a control valve utilized.

Figs. 9, 10, 11 and 12 are diagrammatic views illustrating successive positions of the valve shown in Fig. 8, the views corresponding respectively with the first, second, third and fourth positions identified in that figure.

For purposes of disclosure, I have illustrated in the drawings and will hereinafter describe in detail the preferred embodiment of the invention with the understanding that I do not intend to limit the invention to the particular construction and arrangement shown, it being contemplated that various changes may be made by those skilled in the art without departing from the spirit and scope of the appended claims.

Referring to the drawings, the invention in its preferred form is embodied in a fixture generally designated 10, which is adapted to be movably mounted relative to a machine tool (not shown) for coaction therewith in operating upon a work piece carried by the fixture.

In the present instance the fixture comprises a flat rectangularly shaped base section 11 which is surmounted by a vertically extending longitudinal wall 12; the wall in conjunction with the base simulating an inverted T as shown in cross section in Fig. 4. A pair of spaced braces 13 are cast integrally with the wall and base and extend normally of the respective surfaces of those elements to lend rigidity to the fixture structure.

Means is provided to orient a work piece with respect to a vertical plane defined generally by the wall 12, as well as with respect to a horizontal plane, which in this instance, is defined by the base 11. To this end a plurality of pins 14 rigidly mounted in and extending normally of the wall 12 as indicated in Figs. 1, 3, and 4 have their respective end surfaces in a common plane spaced from the wall 12 and serve to define the position of a work piece relative thereto. But three pins 14 are used since a greater number could neither be readily made to lie within a common plane nor uniformly contact a nonplanar surface.

The work piece may be maintained in fixed position relative to the planes defined by the base 11 and wall 12 by means including any desired form of stops or abutments depending upon the contour and nature of the work contemplated. In the embodiment of the invention selected for purposes of disclosure, however, a tempered plate 15 is keyed in the upper surface of the base 11 and is secured against movement relative thereto by means of set screws 16, the upper surface of the plate being roughened to prevent displacement of the work piece relative to the wall. A second abutment 17 spaced from the plate 15 functions also to support the work relative to the base of the fixture and is, in this instance, specially formed to accommodate a particular contour of work.

Clamping means operable to engage an irregular surface at spaced points with equal pressure to rigidly secure the work in contact with abutments 15 and 17 is provided. In the present embodiment of the invention the clamping means comprises a pair of spaced, pivoted arms 18 and 19, the ends 20 and 21 of which protrude leftwardly of the wall 12 as viewed in Fig. 4, substantially to the plane defined by the ends of the stationary pins 14. The respective under surfaces of the projecting end of the arms 18 and 19 are roughened as is the surface of the plate 15 to facilitate a rigid gripping of the work. Referring particularly to Figs. 1, 2, and 3, the arm 18 is pivotally supported on a pin 22 which is carried by a pair of similar angular brackets 23 which project downwardly into an elongated open slot 24 formed in the upper edge of the wall 12. The brackets 23 are removably held in position by similar screws 25 which engage the upper edge of the wall adjacent the sides of the slot 24. The arm 19 is pivotally mounted upon a machine screw 26 which is carried by a lug 27 formed integrally with the upper edge of the wall. A differential rotating effort is communicated to the respective arms 18 and 19 through the medium of a yoke 28 and similar intermediate connecting links 29 and 30 in such manner as to grip a work piece with substantially equal pressures at their respective points of contact with the work.

Means to actuate the clamping arms 18 and 19, comprising a cylinder and piston device generally designated 31, is supported by the base 11 and operatively connected to the yoke 28. The actuating means 31 includes a cylinder 32 pivotally mounted on a pin 33 supported by a pair of similar upstanding lugs 34 which in turn are carried by a common boss 35 rigidly attached to the base. A piston rod 36 operatively mounted in the cylinder 31 is pivotally connected at 37 to the yoke member 28. A source of fluid under pressure (not shown) is adapted to be connected to the cylinder 31 to effect operation of the clamping arms 18 and 19.

The invention contemplates the provision of a plurality of independently operable yielding abutments which are adapted to support the work piece intermediate the stationary abutments 14. In the present embodiment of the invention a plurality of such abutments are disposed in the surface of the wall 11 to compensate for the structural weaknesses of a particular form of work piece. In this instance the abutments, but one of which shall be described, comprise a shiftable pin 37 (Figs. 4 and 7) which is slidably received in the bore of a cylinder member 38 which in turn is removably positioned in the wall by means of a nut 39 which coacts with a shoulder 40 to restrain the assembly against movement relative to the wall.

Means is provided to yieldably urge the abutment 37 to its outer or work engaging position. With this purpose in view the rearward end of the abutment projects into a transverse chamber 41 within which a plunger 42 is movable to engage a wedging cam surface 43 with the rear end of the abutment and thus force the latter to its outer, or work engaging position. As shown herein (Fig. 7) the chamber 41 is cylindrical and is formed integrally with the cylindrical member 38. To prevent rotation of the wedging plunger 42 and thereby insure a cooperative relationship between its camming surface and the end of the abutment, the former part is provided with a longitudinal keyway 45 which is adapted to receive a key 44 removably secured in the wall of the chamber 41.

The plunger 42 is normally urged downwardly as viewed in Fig 7 to cam the abutment outwardly and for this purpose a coiled spring 46 is slidably mounted in the chamber 41 and acts between the plunger and a removable screw 47 which is threaded axially into the chamber 41.

It will be evident that the springs 46 will function to urge the cam faced plunger 42 in a direction effective to move the abutment outwardly into engagement with a work piece. A limiting outward position of the abutment is defined by a key 48 threaded into the cylinder member 38 to engage a longitudinal keyway 49 formed in the surface of the abutment.

The abutment may be locked in its outer or work-engaging position by means which include in this instance, an element slidable into and out of contact with the plunger 42. Referring to Fig. 6, a cylindrical chamber 50, the bore of which is disposed normally to chamber 41, is slidably fitted with a locking plunger 51. The plunger 51 is formed with a nose 52 adapted to project through a duct 53 which communicates with the interior of chamber 41, the nose 52 being of such length as to provide a contacting engagement with plunger 42. A vent 54, prevents entrapment of air within chamber 50 so as to interfere with the operation of locking plunger 51.

Controlling means effective to actuate the clamping arms 18 and 19 to orient a work piece on the fixture and to lock the shiftable abutments in work engaging position is provided, said means thereafter effecting a release of the shiftable abutments and a subsequent release of the clamping arms 18 and 19 from engagement with the work. Such a controlling means is shown in Figs. 8 and 9 to 12 inclusive and comprises a valve 55 rigidly secured to the fixture by means of screws 56.

The valve 55 is adapted to control a flow of fluid from a source of fluid under pressure (not shown) to the piston and cylinder device 31 as well as to each of the cylindrical chambers 41 and 50. Referring particularly to Figs. 2 and 8, the valve 55 includes a casing 57 having an intake port 58 communicating with the fluid supply, discharge ports 59, 60, 61, 62, and an exhaust port 63. The discharge ports 59 to 62 inclusive, by means of conduits diagrammatically shown at 64, 65, 66 and 67 in Fig. 2, are connected respectively to each of the wedge chambers 41, to the upper end of the piston and cylinder device 31, to each of the locking chambers 50, and to the lower end of the cylinder and piston device 31.

The exhaust port 63 communicates by means of a conduit 63ª with the front, or work engaging side of the support as viewed in Fig. 1 extending substantially its entire length and terminating in an orifice 65 through which a flow of exhausted fluid is directed against the abutment 17 for the purpose of freeing the latter of ground metal as well as any other foreign substance which may be lodged thereon. The intermediate section of the conduit 63ª passes above and in proximity to the plate 15 and has a downwardly opening orifice 66 formed therein which permits a discharge of pressure fluid against the plate to relieve the latter of foreign material in the same manner as the orifice 65 directs a flow of fluid against the abutment 17.

A plug-type valve 67 rotatably carried in the housing 57 has a pair of arcuate grooves 68, 69 formed in its peripheral surface. The plug 67 is rotated to effect the before mentioned operating cycle by means of a handle 70 fixed thereto. A spring pressed plunger 71 slidably fitted in a boss 72 carried by the handle 70 is effective to engage any one of a plurality of recesses 73 in the external surface of the casing at positions corresponding with the several positions of adjustment of the valve.

Referring to Figs. 9 to 12 inclusive, the valve 67 is diagrammatically shown in four positions of adjustment corresponding with the first, second, third and fourth positions respectively of Fig. 8. In Fig. 9 the intake port 58 is effective to conduct pressure fluid to the groove 69 which in turn communicates with the discharge ports 59 and 60, and the conduits 64 and 65 to effect, in the order indicated, a release of the plugs 42 from bearing engagement with the shiftable abutments 37 and a rotation of the clamping arms 20 and 21 to a position in which they are adapted to receive a work piece.

In the above position of the valve, the discharge ports 61 and 62 communicate by means of the groove 68 and conduits 66 and 67 with the locking chambers 50 and the lower end of the piston and cylinder device 31 to discharge pressure fluid from the latter devices to the exhaust port 63 from which the exhausted pressure fluid is conducted to the plate 15 and abutment 17 through the conduit 63ª to be utilized in freeing the plate and abutment of foreign material as has been indicated.

In Fig. 10, in which the plug is shown in the position corresponding with the second position of Fig. 8, pressure fluid is conveyed to each of the discharge ports 59 and 62, thence through the conduits 64 and 67 to the wedge chambers 41 and the lower end of the cylinder and piston device 31 to maintain the plungers 42 out of engagement with their respective yieldable abutments while the clamping arms 20 and 21 engage the work piece to orient it in contact with the plate 15 and abutment 17. The discharge ports 60 and 61 which communicate with the upper end of the cylinder and piston device 31, and the cylindrical chambers 50 through the conduits 65 and 66 respectively, are exhausted in this position of the valve through the groove 68 into the exhaust port 63 and conduit 63ª.

In Fig. 11 the valve is shown in what corresponds with the third position of handle 70, as shown in Fig. 8. In this position pressure fluid will flow from the intake port 58, through groove 69, discharge port 62, and conduit 67 to the lower end of the piston and cylinder device 31 thereby maintaining the work in fixed position between the arms 20, 21 and the plate 15 and abutment 17. At the same time, the discharge port 59 communicates with the groove 68 and exhaust port 63 to permit the pressure fluid in the cylindrical chambers 41 to be exhausted thereby permitting the springs 46 to drive the plungers 42 into camming engagement with the yieldable abutments 37 to force the latter outwardly into engagement with the work piece. The discharge port 60, through conduit 65 and exhaust port 63 serves to exhaust the space above the piston in the cylinder and piston device 31. The discharge port 61 simultaneously exhausts pressure fluid through the conduit 66 from the respective cylindrical chambers 50 into the groove 58 and out through the exhaust port 63 thereby continuing to prevent the plug members 51 from locking the plungers 42 in contact with the yieldable abutments 37.

Fig. 12 diagrammatically indicates the valve in the fourth position of Fig. 8 in which pressure fluid is admitted to the discharge port 62 to maintain the clamping arms 20 and 21 in engagement with the work piece through a flow of pressure fluid to the lower end of the cylinder and piston device 31, while a simultaneous flow of pressure fluid to the cylindrical chambers 50, through the discharge port 61 and conduits 66 functions to force the plugs 51 into locking engagement with the plungers 42 thereby retaining the yieldable abutments in work-engaging position. In this fourth position of the handle, the upper end of the piston and cylinder device 31 as well as wedge cylinders 41 continue to be exhausted through the ports 60, 59, groove 68 and exhaust port 63.

A reverse movement of the handle 70 serves to rotate the valve plug 67 in an opposite direction to operate the several elements of the work support in an inverse order. It will be apparent that I have provided a work fixture in which a work piece may be quickly oriented by moving it into contact with a plurality of stationary abutments after which the work may be clamped in position and automatically supported at a plurality of points intermediate the before mentioned stationary abutments through the operation of a single manipulative means.

I claim as my invention:

1. A work fixture comprising, in combination, a plurality of abutments against which a work piece may be moved to define a limiting position in one direction, a plurality of guides against which the work piece may be moved to define a limiting position in a second direction, a shiftable support movable into and out of work-engaging position, means normally urging said support into work-engaging position, manipulative means to lock said support in work-engaging position and means to retain the work piece in engagement with said abutments and guides.

2. A work fixture comprising in combination, a plurality of stationary abutments to orient a work piece, a plurality of shiftable abutments movable into position to support the work piece, means to simultaneously lock said shiftable abutments against movement in work-engaging position, and means to retain said work piece in oriented position.

3. A work fixture comprising in combination, a plurality of stationary abutments to orient a work piece, a shiftable abutment to support the work piece in oriented position, means to yieldingly urge said shiftable abutment into work-engaging position, means to restrain said shiftable abutment against movement in work-engaging position, and means to hold the work piece in contact with said stationary abutments.

4. A work fixture comprising in combination, means to orient a work piece, clamping means to hold the work piece in oriented position, shiftable means to support the work piece, means normally urging said last mentioned means into work-supporting position, and fluid actuated means effective to lock said shiftable means in work-supporting position.

5. A work fixture comprising in combination, a plurality of stationary abutments to orient a work piece, clamping means to confine the work in oriented position, a shiftable abutment to support the work piece, and a single manipulative means to actuate said clamping means and to hold said shiftable abutment in work-engaging position.

6. A work fixture comprising in combination, a plurality of stationary abutments to orient and support a work piece, clamping means to confine the work piece in engagement with said stationary abutments, a shiftable abutment yieldingly urged into work-engaging position to augment the supporting action of said stationary abutments, and means to hold said shiftable abutment against movement while in work engaging position.

7. A work fixture comprising in combination, a plurality of stationary abutments to orient a work piece, clamping means to confine the work piece in oriented position, a shiftable abutment movable into position to support the work piece, and means operable successively to actuate said clamping means, to hold said shiftable abutment in work engaging position to release said shiftable abutment, and to release said clamping means.

8. A work fixture comprising in combination, a plurality of stationary abutments to orient a work piece, clamping means to confine the work piece in oriented position, a plurality of shiftable abutments movable into position to support the work piece, and manipulative means operable in a single cyclic movement to effect seriatim; engagement of said clamping means with the work piece, locking of said shiftable abutments in work-engaging position, release of said shiftable abutments, and release of said clamping means.

9. A work fixture comprising in combination, a plurality of stationary abutments to orient a work piece, clamping means operative to confine the work piece in oriented position, a plurality of shiftable abutments to support the work piece, and a single manipulative means operable to actuate said clamping means and to hold said shiftable abutments in work-engaging position.

10. A work fixture comprising in combination, means to orient a work piece, means to clamp the work piece in oriented position, pressure fluid actuated means to operate said clamping means, shiftable means effective to support the work piece in oriented position, pressure fluid actuated means to render said supporting means effective, and means to control the supply of fluid pressure to both of said pressure fluid actuated means.

11. A work fixture comprising in combination, a plurality of stationary abutments, clamping means adapted to coact with said stationary abutments to hold a work piece in position, pressure fluid actuated means to operate said clamping means, a plurality of shiftable abutments movable into position to support the work piece, pressure fluid actuated means to hold said last mentioned abutments in work-engaging position, and means to control the supply of pressure fluid to both of said pressure-fluid-actuated means.

12. A work fixture comprising in combination, a plurality of stationary abutments, clamping means adapted to coact with said stationary abutments to rigidly engage a work piece, pressure fluid actuated means to operate said clamping means, a plurality of shiftable abutments movable into position to support the work piece, pressure fluid actuated means to hold said last mentioned abutments in work engaging position, and means operable in a single cyclic movement to control seriatim a flow of pressure fluid to each of said fluid actuated means.

13. In combination with a work fixture, a plurality of pins against which a work piece may be moved to define a limiting position relative to one plane, a pair of guides against which an edge of the work piece may be moved to define a limiting position in a plane substantially normal to said first mentioned plane, a pair of clamping members opposed to said guides to clamp a work piece thereon, a plurality of independently mounted spring-pressed abutments slidable toward and away from a work piece, and means to simultaneously lock said abutments in work-engaging position.

14. A work support comprising a base, a work-supporting abutment slidable relative to said base into and out of work-supporting position, automatically operable means to move said abutment into said work-supporting position, and manipulative means independent of said first-mentioned means to hold said abutment against movement in said work-supporting position.

15. A work support comprising, in combination, work-holding means, a work-supporting abutment shiftable into and out of work-supporting position, means normally tending to move said abutment into said work-supporting position, and means to hold said abutment in said work-supporting position.

16. A work support comprising a base, a work supporting abutment slidable relative to said base into and out of work-supporting position, means to yieldingly urge said abutment into said work-supporting position, and pressure fluid actuated means to hold said abutment in said work-supporting position.

17. A work fixture comprising in combination, a plurality of stationary abutments to orient a work piece, clamping means to confine the work piece in oriented position, a shiftable abutment movable into position to support the work piece during a tooling operation, and fluid operated means to hold said shiftable abutment in work-engaging position.

18. A work fixture comprising in combination, a base, a work-supporting abutment slidably mounted on said base, a cam in operative engagement with said abutment, a spring to actuate said cam to move said abutment into work-engaging position, and pneumatically operated means effective to lock said cam against movement by said spring.

19. A work fixture for machine tools comprising, in combination, work clamping means exerting pressure on the work in one direction, a plurality of automatically adjustable abutment members urged in a direction normal to said one direction and opposite to the direction of pressure of the tool on the work for additionally supporting the work at a plurality of non-planar points, and manually controlled means operable to prevent said member from being urged toward the work and to hold said members in their adjusted positions.

20. A work fixture for holding irregularly shaped work pieces in a machine tool comprising, in combination, work clamping means for exerting pressure on the work in one direction, a plurality of abutment members urged in a direction normal to said one direction and opposite to the direction of pressure of the tool on the work, each of said members being automatically adjustable to accommodate the irregular shape of the work pieces, means for urging said abutment members in said direction, and manually controlled means for rendering said last mentioned means ineffective.

21. A work fixture for holding irregularly shaped work pieces in a machine tool comprising, in combination, work clamping means for exerting pressure on the work in one direction, and a plurality of manually controlled abutment members acting in a direction normal to said one direction and opposite to the direction of pressure of the tool on the work, each of said members being automatically adjustable to accommodate the irregular shape of the work pieces, and means for locking said members in their adjusted positions.

DONALD R. HALL.